United States Patent
Wang et al.

(10) Patent No.: US 11,144,700 B1
(45) Date of Patent: Oct. 12, 2021

(54) GROUPING NETS TO FACILITATE REPEATER INSERTION

(71) Applicant: Synopsys, Inc., Mountain View, CA (US)

(72) Inventors: Kai-Ping Wang, Fremont, CA (US); Iris E. Chen, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/125,522

(22) Filed: Dec. 17, 2020

Related U.S. Application Data

(60) Provisional application No. 62/951,286, filed on Dec. 20, 2019.

(51) Int. Cl.
G06F 30/3953 (2020.01)
G06F 30/347 (2020.01)
G06F 115/02 (2020.01)
G06F 113/18 (2020.01)

(52) U.S. Cl.
CPC ........ *G06F 30/3953* (2020.01); *G06F 30/347* (2020.01); *G06F 2113/18* (2020.01); *G06F 2115/02* (2020.01)

(58) Field of Classification Search
CPC .................................................. G06F 30/3953
USPC ........................................................ 716/114
See application file for complete search history.

(56) References Cited

U.S. PATENT DOCUMENTS

2018/0157782 A1* 6/2018 Rossi .................. H01L 25/0655

* cited by examiner

*Primary Examiner* — Eric D Lee
(74) *Attorney, Agent, or Firm* — Park, Vaughan, Fleming & Dowler LLP; Laxman Sahasrabuddhe

(57) ABSTRACT

Route segments of a set of nets may be grouped into route groups. Terminals of the set of nets may be grouped into terminal groups. For each net in the set of nets, a net signature may be determined based on route groups associated with the net and terminal groups associated with the net. The set of nets may be grouped into net groups based on the net signatures.

20 Claims, 9 Drawing Sheets
(6 of 9 Drawing Sheet(s) Filed in Color)

US 11,144,700 B1

GROUPING NETS TO FACILITATE REPEATER INSERTION

RELATED APPLICATION

This application claims the benefit of U.S. Provisional Application Ser. No. 62/951,286, filed on 20 Dec. 2019, the contents of which are herein incorporated by reference in their entirety for all purposes.

TECHNICAL FIELD

The present disclosure relates to integrated circuit (IC) design. More specifically, the present disclosure relates to grouping nets to facilitate repeater insertion.

BACKGROUND

Interconnects may refer to nets at the top-level of an IC design that enable circuit blocks in the IC design to communicate with each other. Interconnects may be routed via routing channels (which are spaces between the blocks that are available for routing interconnects), or via metal routing shapes that are routed on one or more metal layers. Repeaters may be used to speed up communication over the interconnects. An increasing demand for computing and storage capacity has made it very challenging to create large and complex IC designs that have the desired performance.

SUMMARY

Some embodiments described herein may group route segments of a set of nets into route groups. The embodiments may then group terminals of the set of nets into terminal groups. Next, for each net in the set of nets, the embodiments may determine a net signature for the net based on route groups associated with the net and terminal groups associated with the net. The embodiments may then group the set of nets into net groups based on the net signatures.

Some embodiments may provide a graphical user interface (GUI) that specifies the net groups, wherein each net group corresponds to a distinct color. Next, a selection of a net group (and optionally a priority assignment to the net group) may be received via the GUI. An operation (e.g., repeater insertion) may then be performed on the selected net group. In embodiments where net groups are assigned priorities, the operation may be performed on the net groups in accordance with the priority assignments.

In some embodiments, grouping the route segments may include identifying route segments that are on a same routing layer and are within a threshold orthogonal distance of each other.

In some embodiments, grouping the terminals may include identifying terminals that have a same signal direction and are within a threshold Manhattan distance of each other.

In some embodiments, determining the net signature may include combining (e.g., concatenating) a sequence of terminal group identifiers and route group identifiers associated with the net.

BRIEF DESCRIPTION OF THE FIGURES

The patent or application file contains at least one drawing executed in color. Copies of this patent or patent application publication with color drawing(s) will be provided by the Office upon request and payment of the necessary fee.

The disclosure may be understood based on the detailed description given below and the accompanying figures. The figures are for illustrative purposes, and do not limit the scope of the disclosure. Furthermore, the figures are not necessarily drawn to scale.

DETAILED DESCRIPTION

Figure 1:
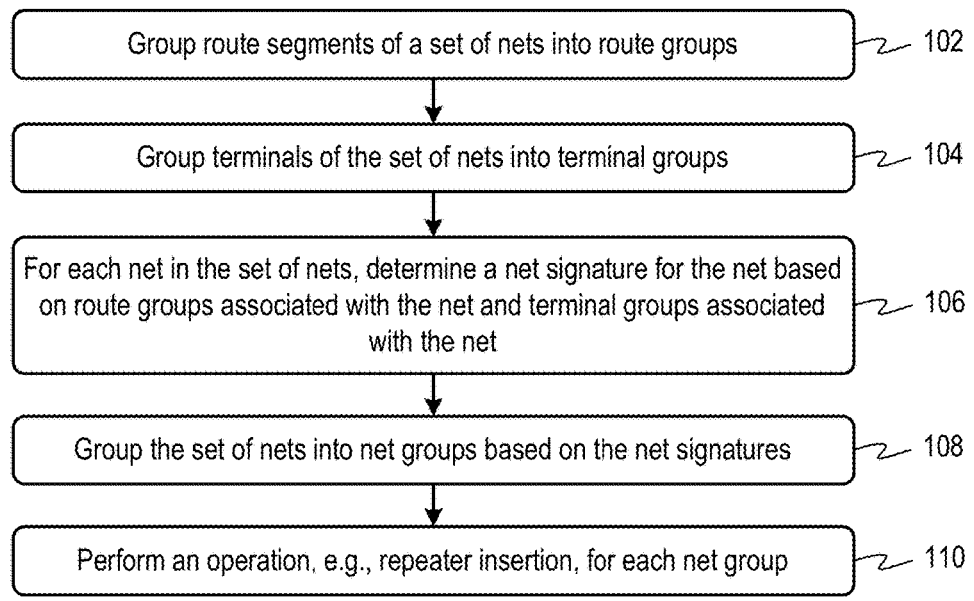
FIG. 1 illustrates a process for grouping nets in accordance with some embodiments described herein.

Aspects of the present disclosure relate to grouping nets to facilitate repeater insertion. When the number of interconnects is small, users may plan the repeater insertion locations manually based on the routing topology. Users may also instruct the routing tool to route the nets of logical buses with the same topology to ensure that the timing delays for nets in a bus are similar. Users would also want the nets with similar routing topology to have similar timing results.

In large and complex IC designs, the number of interconnects can be very large and their routing topologies can be complex and overlapping, which can make it very challenging to route logical buses with the same topology. Thus, a large bus may be split and routed with different routing topologies, and non-bus nets may be routed with the same topology as the bus interconnects. At advanced process technology nodes, the areas that are available for routing the interconnects is becoming smaller. Therefore, interconnects may need to be routed on different routing layers. Routes on different layers that are in the same direction (horizontal or vertical) may overlap with each other. For nets with similar routing topologies, or nets in the same bus, the repeaters may end up being placed far apart, which can make it challenging to achieve timing and/or signal integrity closure.

To achieve timing objectives, designers need to identify net groups that have similar routing topology from many route overlapping areas to plan on how repeaters can be added for each group of nets or nets in buses. This can be a very time consuming process if it is done manually. In addition, when planning repeater locations on overlapping routes in the same region, the repeaters may need to be inserted in a certain order to ensure that the desired timing goals are met. Due to overlapping routes, it can be difficult to determine the correct repeater insertion order, and whether the desired location is available for repeater insertion. For these reasons, the planning and implementation of interconnects has become a very timing consuming and error-prone process in large and complex IC designs.

Embodiments disclosed herein provide techniques and systems for grouping nets to facilitate repeater insertion. Specifically, embodiments disclosed herein may automatically group nets with similar routes. Each net group may then be assigned a priority, and repeater insertion (or any other operation) may be performed on each net group based on the assigned priority. Advantages of embodiments disclosed herein include, but are not limited to, (1) producing an IC design that includes neatly organized repeater locations, (2) producing an IC design in which the nets that have similar routes have similar timing characteristics, (3) enabling shorter turnaround time by reducing the amount of time required to achieve timing and signal integrity closure of the IC design, which also reduces the total amount of processing time required to achieve timing and signal integrity closure, and (4) producing an IC design with high quality or results (QoR).

FIG. 1 illustrates a process for grouping nets in accordance with some embodiments described herein.

The process may begin by grouping route segments of a set of nets into route groups (at 102). A high level description of an IC design may be converted into a netlist during synthesis. The term "netlist" may refer to a network of cells (e.g., AND gates, OR gates, MUXs, etc.) that implement the desired functionality of the IC design. The term "cell" may represent an actual portion of an IC chip that is created when the IC design is manufactured. A netlist is a list (or collection) of nets, where each "net" may refer to the set of routing shapes that electrically connect an output of a driver cell with an input of at least one load cell. The term "driver cell" refers to a cell whose output drives a current or voltage signal through the net, and the term "load cell" refers to a cell whose input receives the current or voltage signal over the net.

Figure 2:
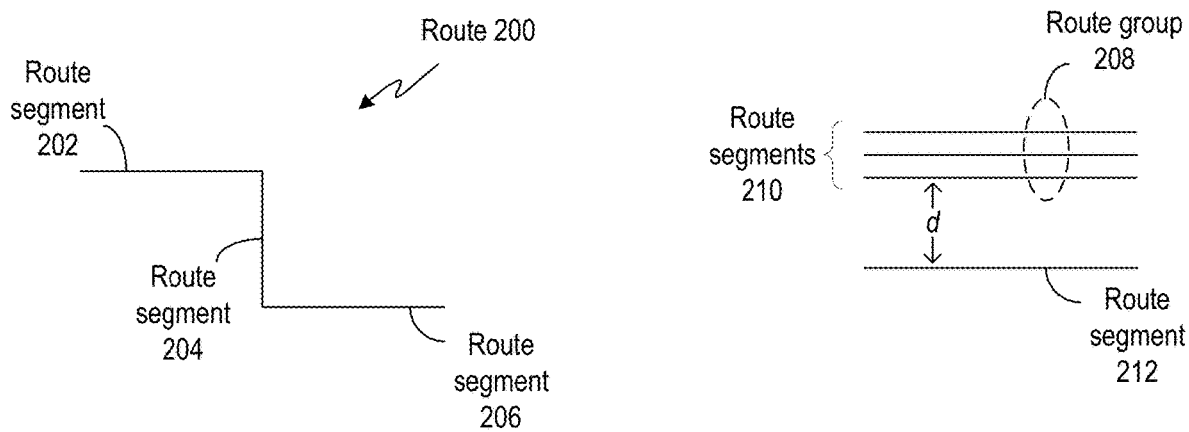
FIG. 2 illustrates a route group in accordance with some embodiments disclosed herein.

FIG. 2 illustrates a route group in accordance with some embodiments disclosed herein. Route 200 represents a route of a net, i.e., route 200 represents the network of polysilicon and/or metal shapes in the net. Specifically, route 200 includes route segments 202, 204, and 206. Each route segment is a straight electrical connection that (1) is routed along a specific direction (e.g., horizontal or vertical) and (2) is on a specific routing layer.

Some embodiments disclosed herein may group route segments that are the same direction (horizontal or vertical) and on the same routing layer based on a threshold orthogonal distance. Route segments that are in a route group may be assigned a unique route group identifier. For example, route segments 210 which are in the same direction (horizontal) and on the same routing layer may be grouped into route group 208. Route segment 212 is not part of route group 208 because the orthogonal distance d between route group 208 and route segment 212 is greater than a threshold orthogonal distance (the word "orthogonal" refers to the fact that the distance is measured orthogonally to the routing direction).

Some embodiments disclosed herein may use the following process to assign route groups. First, each route segment may be represented by a bounding box which corresponds to the rectangular shape of the route segment. Note that each route segment corresponds to a rectangular-shaped conducting material, e.g., polysilicon or metal. Next, neighboring route segments in the same direction and on the same routing layer are collected into the same route group if the distance between their respective bounding boxes are within a threshold orthogonal distance. If a route segments belongs to multiple route groups, then the route groups are merged into a single route group.

In some embodiments disclosed herein, an upper limit may exist on the number of routing segments that may be grouped into a single routing group. In these embodiments, a route group that is larger than the upper limit may be partitioned into smaller route groups so that no route group has more than the upper limit of route segments.

In this manner, a set of route groups may be created, where each route segment belongs to one route group. Each route group may then be assigned a unique route group identifier, and each route segment in each route group may be assigned the unique route group identifier of the route group.

Referring to FIG. 1, the process may then group terminals of the set of nets into terminal groups (at 104).

Figure 3:
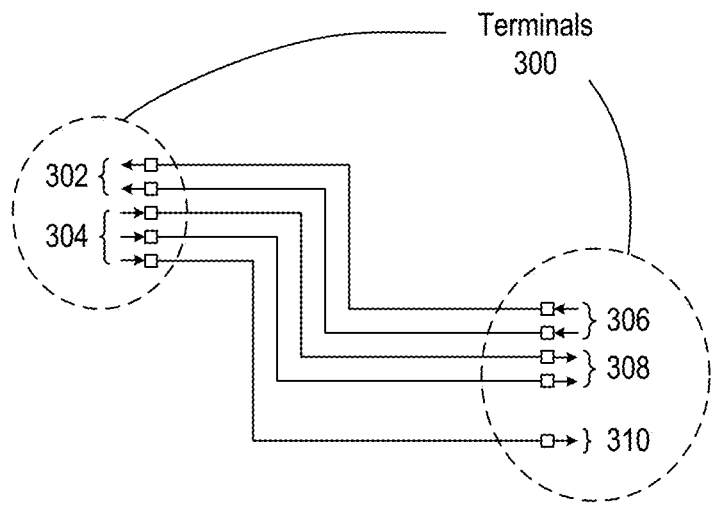
FIG. 3 illustrates terminal groups in accordance with some embodiments disclosed herein.

FIG. 3 illustrates terminal groups in accordance with some embodiments disclosed herein. The term "terminal" may refer to a rectangular conducting shape that represents an input or output of a cell.

Some embodiments disclosed herein may group terminals based on their locations and their signal directions. Terminals 300 may correspond to inputs and outputs of driver and load cells in a set of nets. Each small square in FIG. 3 represents a terminal, and a small arrow next to each small square represents a signal direction of the terminal. For example, if an output of a driver cell is electrically connected to an input of a load cell, then the terminal corresponding to the output of the driver cell may have an incoming arrow (i.e., the arrowhead points toward the square), and the terminal corresponding to the input of the load cell may have an outgoing arrow (i.e., the arrowhead points away from the square).

Some embodiments disclosed herein may use the following process to group terminals. First, each terminal may be represented by its location (e.g., X-Y coordinates) and signal direction (e.g., in or out). Next, neighboring terminals with the same signal direction may be grouped together if they are within a threshold Manhattan distance (the Manhattan distance between two points may refer to the sum of the absolute differences of their coordinates).

In some embodiments disclosed herein, an upper limit may exist on the number of terminals that may be grouped into a single terminal group. In these embodiments, a terminal group that is larger than the upper limit may be partitioned into smaller terminal groups so that no terminal group has more than the upper limit of terminals.

In this manner, a set of terminal groups may be created, where each terminal belongs to one terminal group. Each terminal group may then be assigned a unique terminal group identifier, and each terminal in each terminal group may be assigned the unique terminal group identifier of the terminal group.

For example, terminals 302, 304, 306, 308, and 310 may be grouped into separate terminal groups. Terminals 302 and 304 were grouped into separate terminal groups because they have different signal directions even though they are within the Manhattan distance threshold. Terminal 310 was grouped separately from terminals 308 because terminal 310 was further than the Manhattan distance threshold even though terminal 310 has the same signal direction as terminals 308.

Referring to FIG. 1, for each net in the set of nets, the process may determine a net signature based on route groups associated with the net and terminal groups associated with the net (at 106).

In some embodiments, a net signature may be constructed by combining (e.g., concatenating) a sequence of terminal group identifiers and route group identifiers separated by a delimiter. Specifically, the net signature may begin with the terminal group identifier corresponding to the driver cell, and end with the terminal group identifier corresponding to the load cell, with route group identifiers in between which appear in sequence based on the route from the driver cell to the load cell. Note that this process for constructing the net signature implicitly encodes the signal direction because the terminal group identifier corresponding to the driver cell appears at the beginning of the net signature and the terminal group identifier corresponding to the load cell appears at the end of the net signature. This example for constructing the net signature is for illustration purposes only and is not intended to limit the scope of this disclosure.

Referring to FIG. 1, the process may group the set of nets into net groups based on the net signatures (at 108). Specifically, the nets that have the same net signature are grouped into the same net group. Thus, the net signature may be considered to be a unique net group identifier. Note that each net is assigned to one net group.

When a net group includes a large number of nets, the timing requirements of the nets in the group may be different. In some embodiments, the net group may be divided into multiple sub-groups. Specifically, a large net group may be divided into multiple sub-groups based on user specified criteria, e.g. maximum number of nets in a group, total number of sub-groups, etc. When dividing a net group into sub-groups, the nets may first be sorted by their driver locations. Then, the nets may be assigned new net group identifiers in the order of their driver locations, such that the nets in the same sub-group are contiguous and in proximity to each other, and are not interleaved with nets belonging to other sub-groups.

Figure 4A:
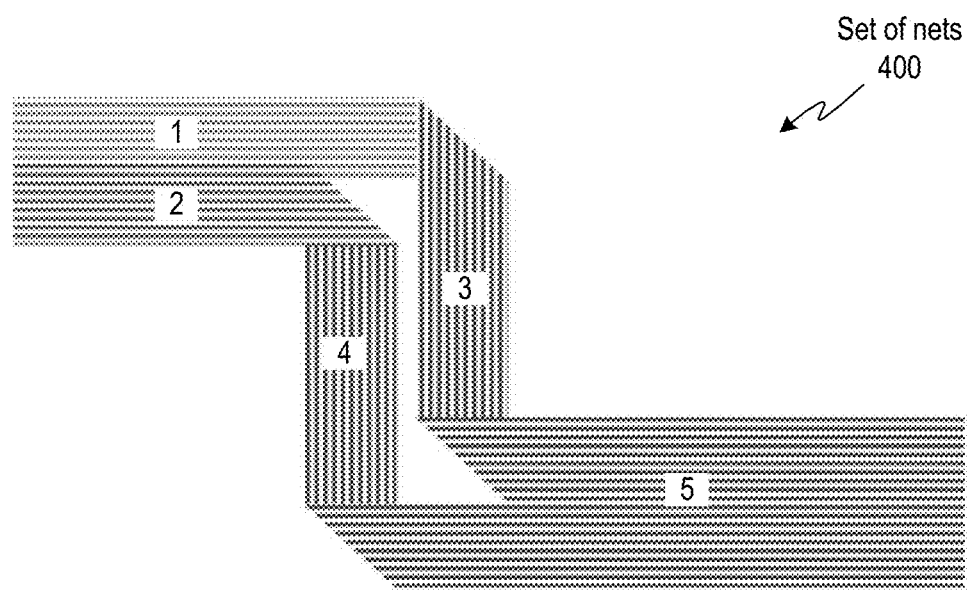
FIGS. 4A-4D illustrate route groups, terminal groups, net signatures, and net groups for a set of nets in accordance with some embodiments disclosed herein.
Figure 4B:
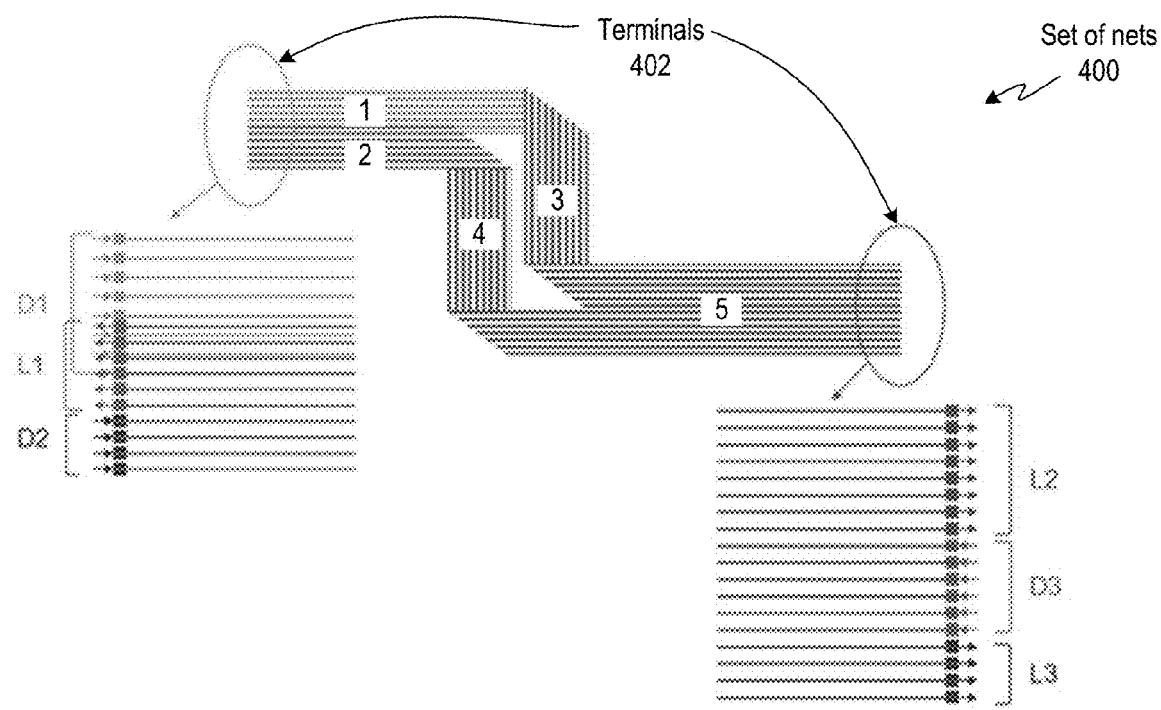
Figure 4C:
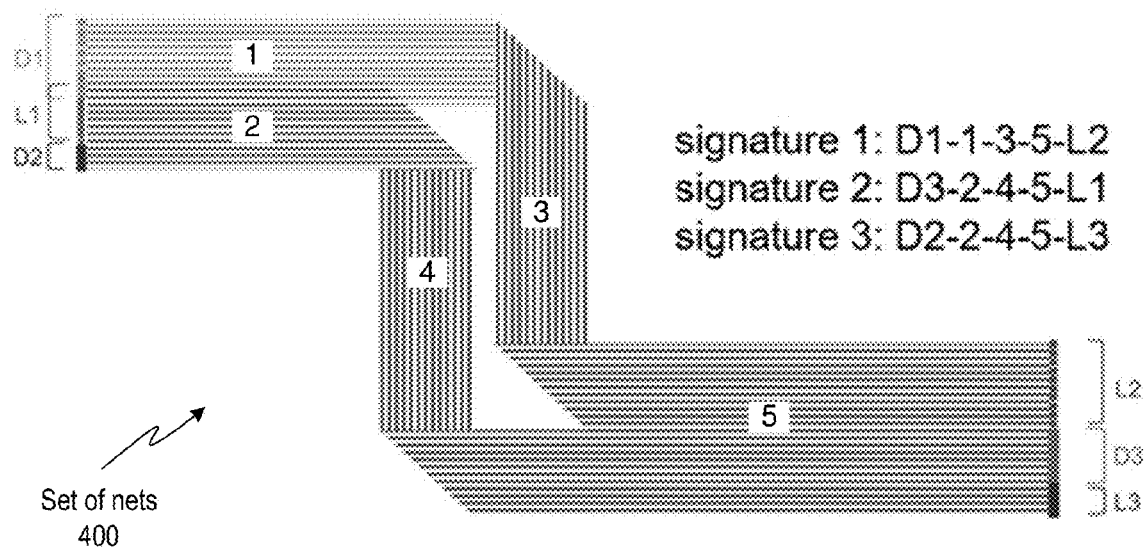
Figure 4D:
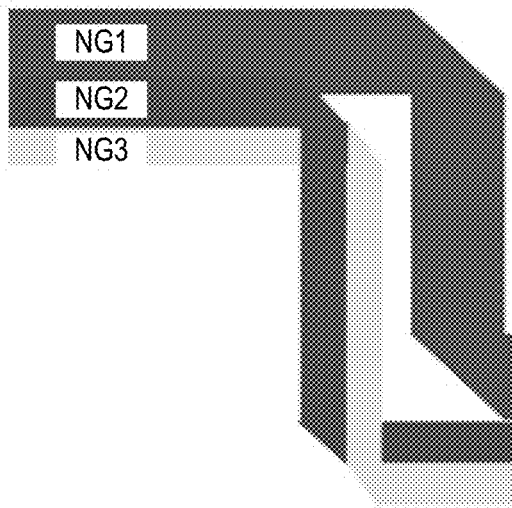

FIGS. 4A-4D illustrate route groups, terminal groups, net signatures, and net groups for a set of nets in accordance with some embodiments disclosed herein. In FIGS. 4A-4C, distinct colors correspond to distinct routing layers. In FIG. 4D, distinct colors correspond to distinct net groups (or net signatures).

In FIG. 4A, route groups associated with route group identifiers 1-5 were created based on the routes of set of nets 400. Route segments in route group identifiers 1 and 2 were within a threshold orthogonal distance, but were assigned to different route groups because the route segments were in different routing layers (yellow and green colors). Route segments in route group identifiers 3 and 4 were on the same routing layer (red), but were assigned to different route groups because the route segments were not within the threshold orthogonal distance. Route segments in route group identifier 5 were on the same routing layer (blue) and were within the threshold orthogonal distance. Thus, these route segments were assigned to the same group. Note that each route segment belongs to the route of a net, and the route group of each route segment is associated with the net.

In FIG. 4B, terminals 402 were grouped into terminal groups D1, D2, D3, L1, L2, and L3 based on their locations and signal direction. In particular, terminals in terminal groups D1 and L1 were within a threshold Manhattan distance, but were assigned to different terminal groups because the terminals had different signal directions. Specifically, terminals in terminal group D1 were associated with driver cells, and terminals in terminal group L1 were associated with load cells. Terminals in terminal groups D1 and D2 had the same signal direction (because these terminals were associated with driver cells), but were assigned to different groups because they were not within the threshold Manhattan distance. Likewise, terminals in terminal groups D3, L2, and L3 were also assigned to their respective terminal groups.

In FIG. 4C, three distinct net signatures were created based on combining (e.g., concatenating) the terminal group identifiers and route group identifiers for set of nets 400. As shown in FIG. 4C, the three net signatures for set of nets 400 are D1-1-3-5-L2, D3-2-4-5-L1, and D2-2-4-5-L3.

In FIG. 4D, nets with the same net signature are grouped into a net group. Specifically, net group NG1 corresponds to net signature D1-1-3-5-L2, net group NG2 corresponds to net signature D3-2-4-5-L1, and net group NG3 corresponds to net signature D2-2-4-5-L3. Each net group is illustrated using a distinct color in FIG. 4D: NG1 is red, NG2 is blue, and NG3 is yellow.

Figure 5:
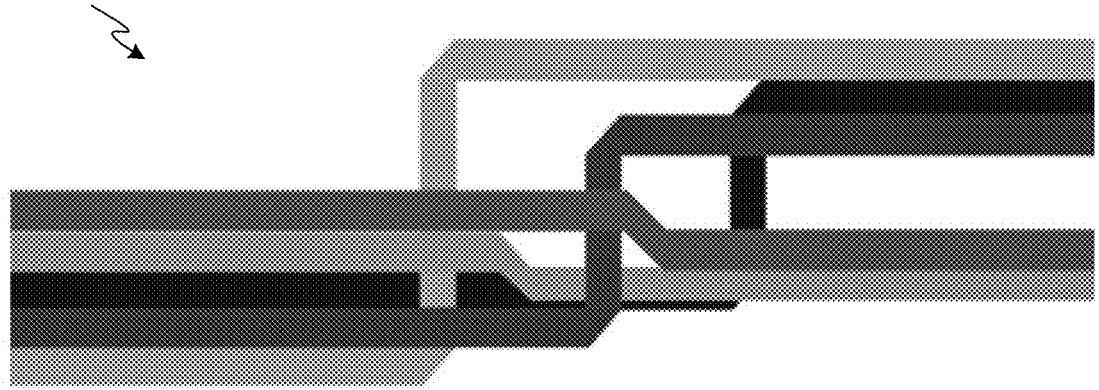
FIG. 5 illustrates five net groups that were determined based on a set of nets in accordance with some embodiments disclosed herein.

FIG. 5 illustrates five net groups that were determined based on a set of nets in accordance with some embodiments disclosed herein. Once the net groups in set of nets 500 have been identified, the net groups (which may have complicated overlapping routes) may be visually separated by assigning different colors as shown in FIG. 5. Specifically, some embodiments disclosed herein may provide a GUI that specifies different net groups to a user by using distinct colors or patterns for each net group, as shown in FIG. 5. In this manner, users may be able to easily identify net groups within a given set of net even if the set of nets have complicated overlapping routes.

Referring to FIG. 1, the process may then perform an operation, e.g., repeater insertion, for each net group (at 110). Specifically, some embodiments disclosed herein may allow a user to select a particular net group by using the GUI, and perform an operation (e.g., repeater insertion) on the nets belonging to the selected net group. In some embodiments disclosed herein, the user may assign a priority to each net group by using the GUI, and perform an operation (e.g., repeater insertion) on the nets of each net group in accordance with the assigned priorities.

Specifically, net groups that have stringent timing constraints and/or have limited amount of repeater insertion resources may be identified. Next, the net groups may be prioritized based on these criteria. Specifically, net groups that have stringent timing constraints and have limited amount of repeater insertion resources may be assigned a higher priority than other net groups that have less stringent timing constraints and/or have sufficient amount of repeater insertion resources.

For example, each net group may be assigned a timing constraint priority based on a total negative timing slack of a net group, where a more negative timing slack is assigned a higher timing constraint priority. Each net group may also be assigned a resource scarcity priority based on the availability of repeater resources (e.g., the percentage of repeater locations that are available along the nets in the net group), where lower availability of repeater resources is assigned a higher resource scarcity priority. Next, an overall priority for a net group may be determined based on the timing constraint priority and the resource scarcity priority (e.g., a sum of the two priorities may be used as the overall priority). Repeater insertion may then be performed on the net groups in accordance with their priorities. Specifically, repeater insertion may first be performed on nets in the highest priority net group, then repeater insertion may be performed on nets in the second highest priority net group, and so forth.

Figure 6A:
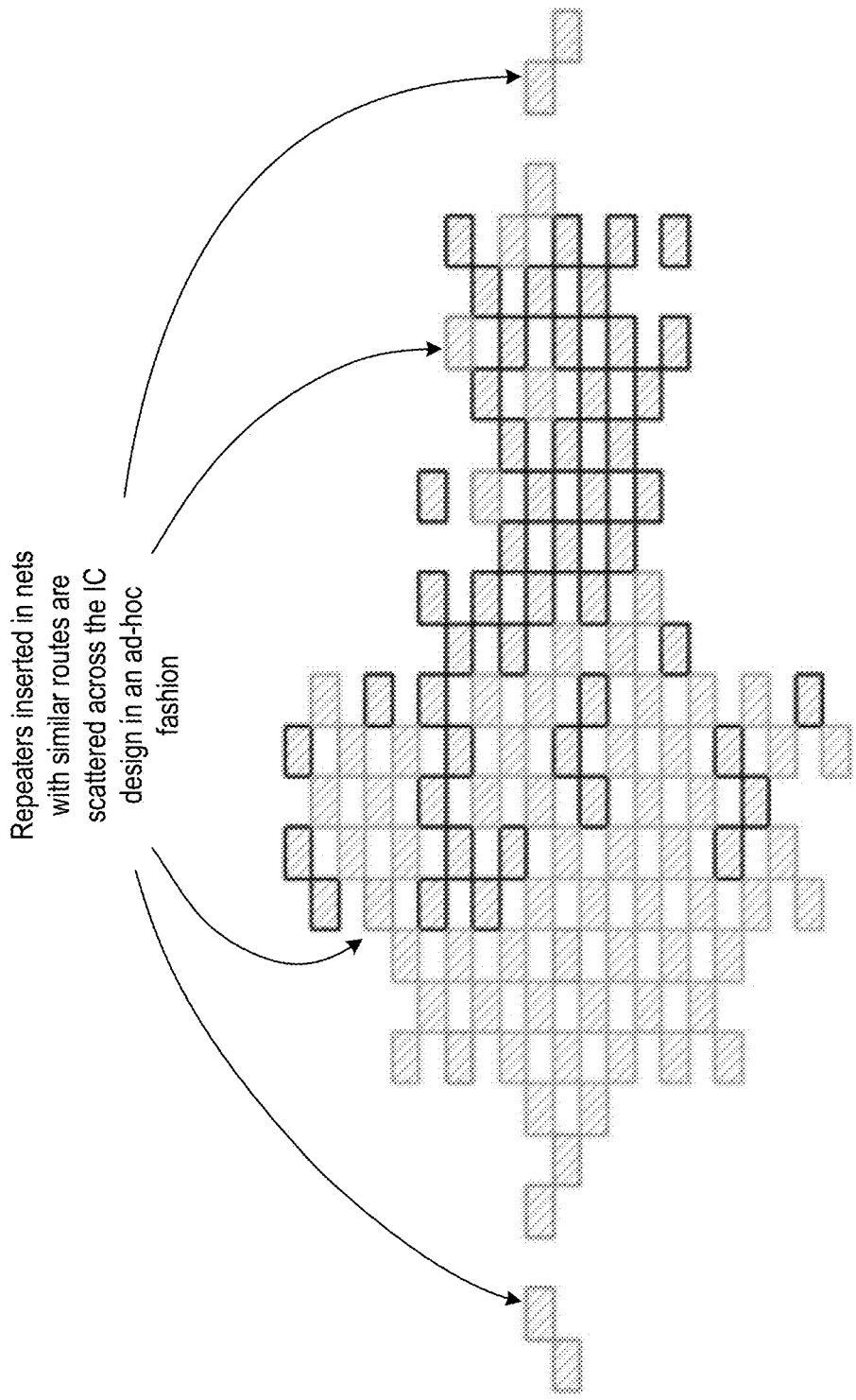
FIGS. 6A-6B illustrates repeater insertion without and with net grouping in accordance with some embodiments disclosed herein.
Figure 6B:
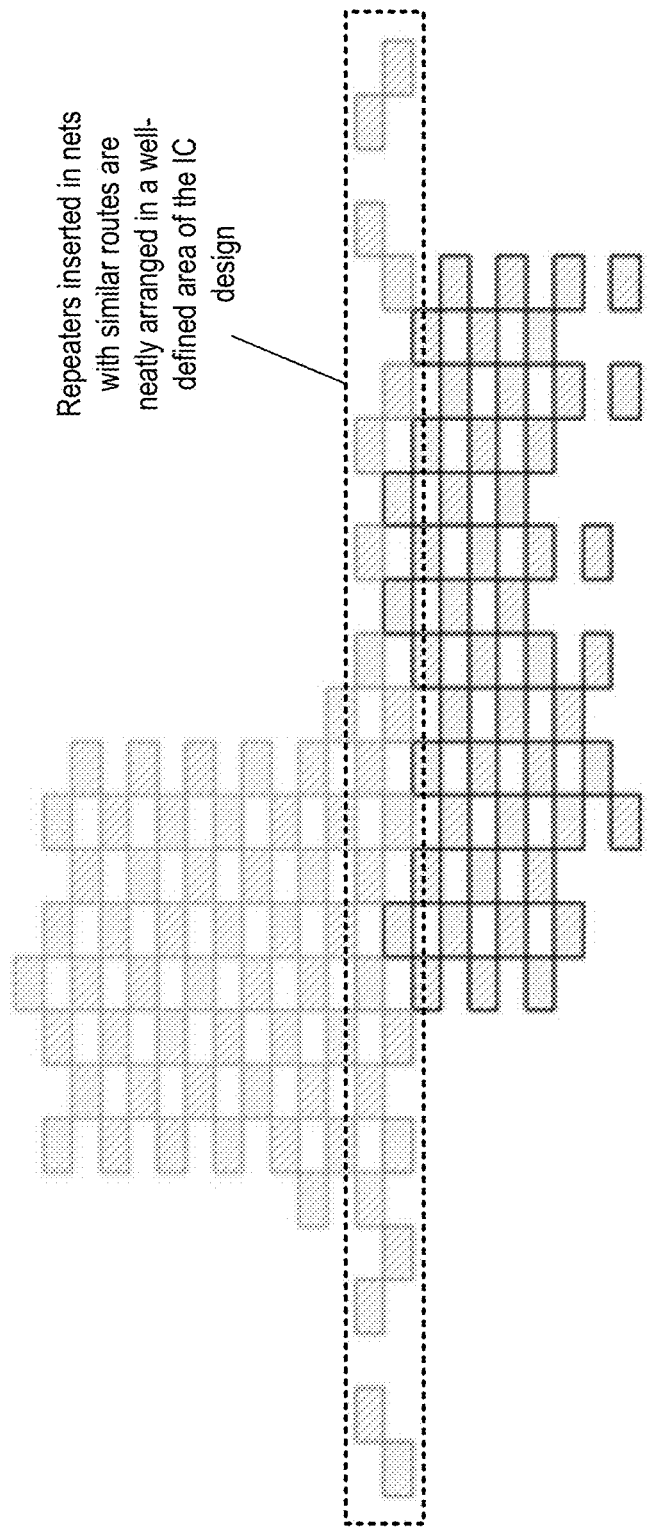

FIGS. 6A-6B illustrates repeater insertion without and with net grouping in accordance with some embodiments disclosed herein. In FIGS. 6A-6B, each color corresponds to nets that have similar routes (and therefore may be grouped together using embodiments described herein). FIG. 6A shows repeater locations when the nets are not grouped in accordance with some embodiments disclosed here. As shown in FIG. 6A, repeaters inserted in nets with similar routes are scattered across the IC design in an ad-hoc and haphazard fashion. FIG. 6B shows repeater locations when the nets are grouped in accordance with some embodiments disclosed here. As shown in FIG. 6B, repeaters inserted in nets with similar routes are neatly arranged in a well-defined area in the IC design.

Figure 7A:
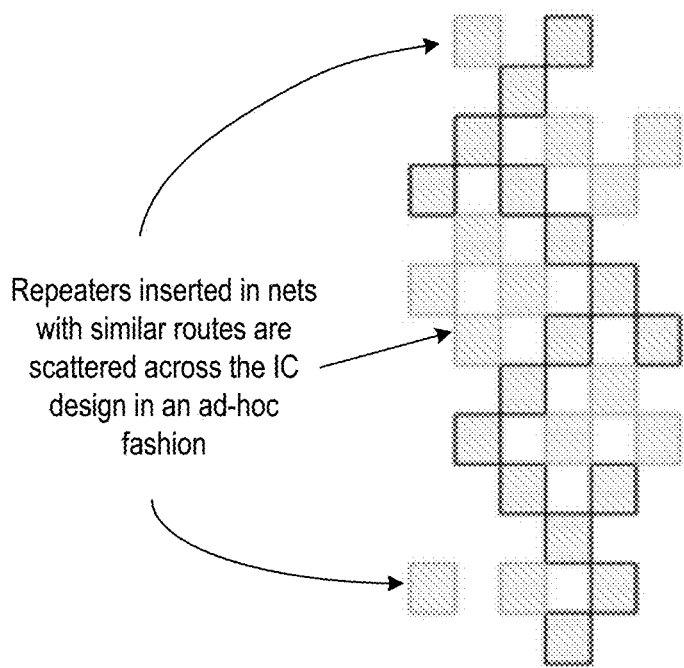
FIGS. 7A-7B illustrates repeater insertion without and with net grouping in accordance with some embodiments disclosed herein.
Figure 7B:
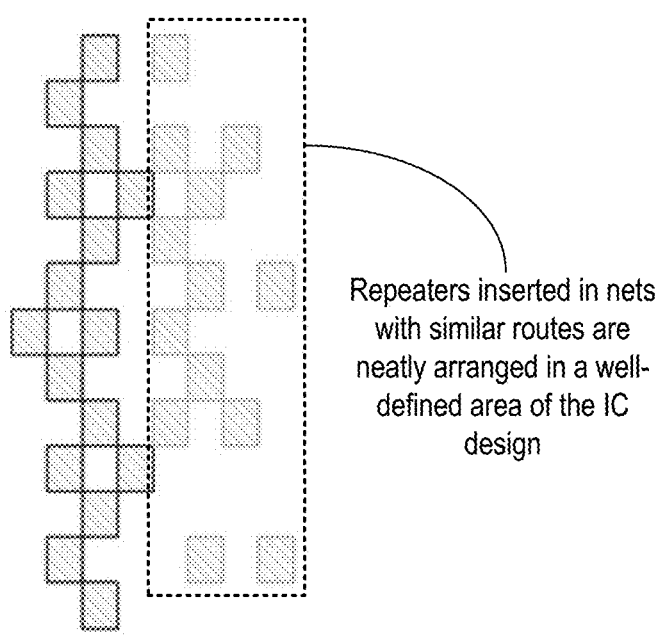

FIGS. 7A-7B illustrates repeater insertion without and with net grouping in accordance with some embodiments disclosed herein. In FIGS. 7A-7B, each color corresponds to nets that have similar routes (and therefore may be grouped together using embodiments described herein). FIG. 7A shows repeater locations when the nets are not grouped in accordance with some embodiments disclosed here. As shown in FIG. 7A, repeaters inserted in nets with similar routes are scattered across the IC design an ad-hoc and haphazard fashion. FIG. 7B shows repeater locations when the nets are grouped in accordance with some embodiments disclosed here. As shown in FIG. 7B, repeaters inserted in nets with similar routes are neatly arranged in a well-defined area in the IC design.

Neatly organized repeater locations can cause the timing characteristics of nets in a net group to be highly correlated, which in turn, can enable faster timing and signal integrity closure of the IC design and improve the QoR of the IC design.

Figure 8:
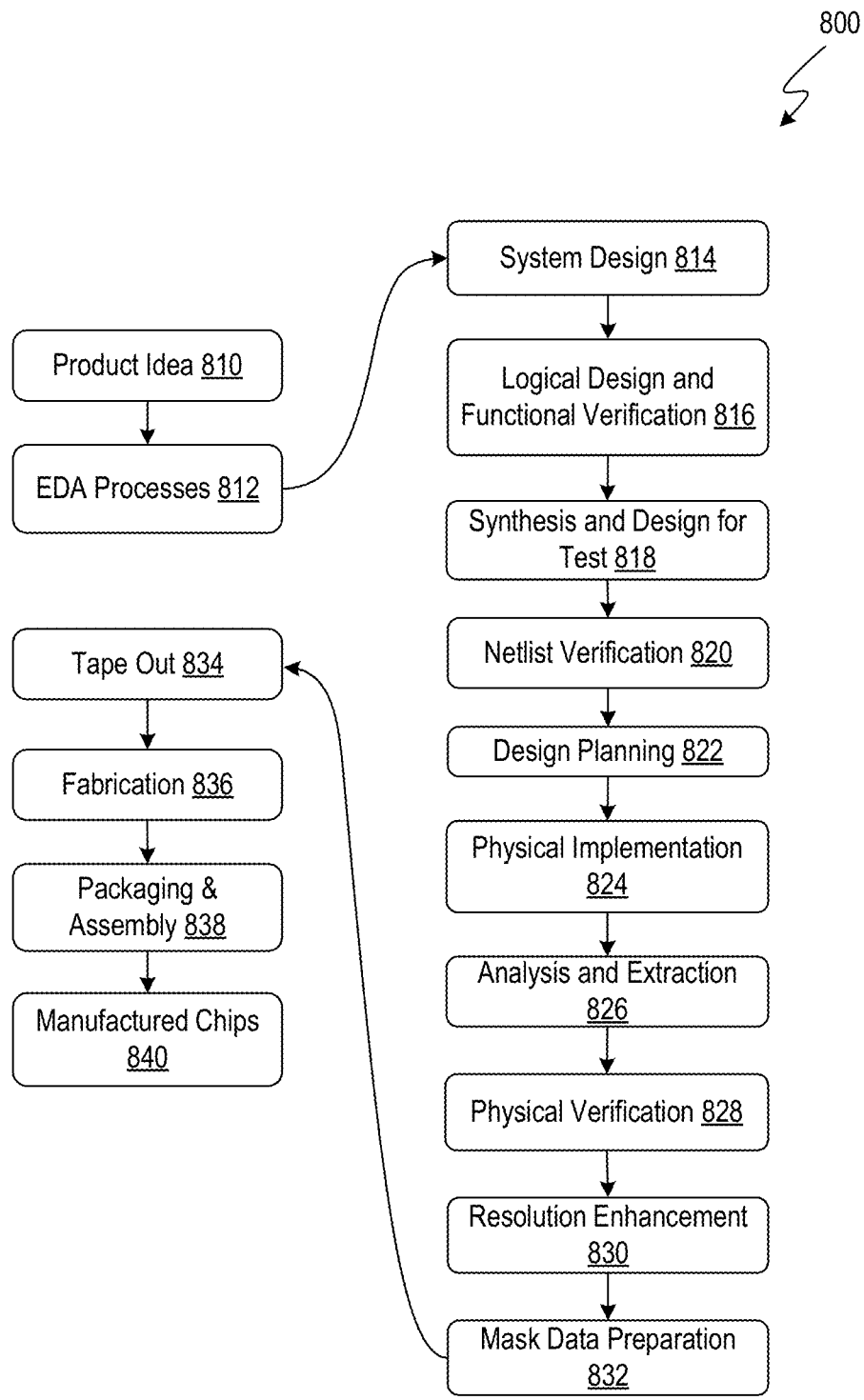
FIG. 8 illustrates an example flow for the design, verification, and fabrication of an integrated circuit in accordance with some embodiments described herein.

FIG. 8 illustrates an example flow 800 for the design, verification, and fabrication of an integrated circuit in accordance with some embodiments described herein. EDA processes 812 (the acronym "EDA" refers to "Electronic Design Automation") can be used to transform and verify design data and instructions that represent the integrated circuit. Each of these processes can be structured and enabled as multiple modules or operations.

Flow 800 can start with the creation of a product idea 810 with information supplied by a designer, information which is transformed and verified by using EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly 838 are performed to produce the manufactured IC chip 840.

Specifications for a circuit or electronic structure may range from low-level transistor material layouts to high-level description languages. A high-level of abstraction may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower abstraction level that is a less abstract description adds more detail into the design description. The lower levels of abstraction that are less abstract descriptions can be generated by a computer, derived from a design library, or created by another design automation process. An example of a specification language at a lower level of abstraction language for specifying more detailed descriptions is SPICE (which stands for "Simulation Program with Integrated Circuit Emphasis"). Descriptions at each level of abstraction contain details that are sufficient for use by the corresponding tools of that layer (e.g., a formal verification tool).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as "emulators" or "prototyping systems" are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
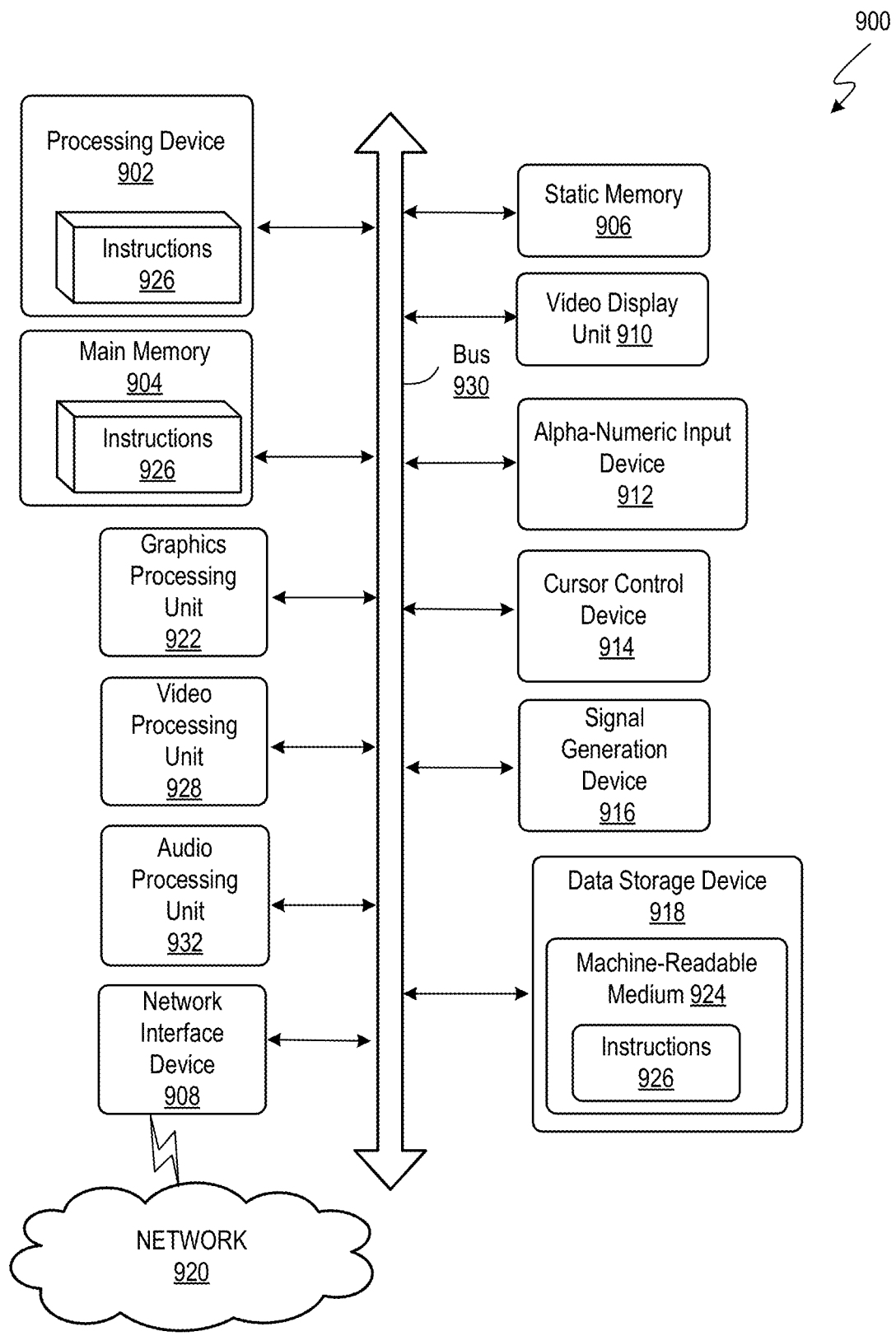
FIG. 9 illustrates an example machine of a computer system within which a set of instructions, for causing the machine to perform any one or more of the methodologies discussed herein, may be executed.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
grouping, by a processor, route segments of a set of nets into route groups;
grouping terminals of the set of nets into terminal groups;
for each net in the set of nets, determining a net signature for the net based on route groups associated with the net and terminal groups associated with the net; and
grouping the set of nets into net groups based on the net signatures.

2. The method of claim 1, comprising providing a graphical user interface (GUI) that specifies the net groups, wherein each net group corresponds to a distinct color.

3. The method of claim 2, comprising receiving a selection of a first net group via the GUI.

4. The method of claim 3, comprising performing an operation on the first net group.

5. The method of claim 4, wherein the operation is repeater insertion.

6. The method of claim 1, wherein the grouping the route segments comprises identifying route segments that are on a same routing layer and are within a threshold orthogonal distance of each other.

7. The method of claim 1, wherein the grouping the terminals comprises identifying terminals that have a same signal direction and are within a threshold Manhattan distance of each other.

8. The method of claim 1, wherein the determining the net signature comprises combining a sequence of terminal group identifiers and route group identifiers associated with the net.

9. A system, comprising:
a memory storing instructions; and
a processor, coupled with the memory and to execute the instructions, the instructions when executed cause the processor to:
group route segments of a set of nets into route groups;
group terminals of the set of nets into terminal groups;
for each net in the set of nets, determine a net signature for the net based on route groups associated with the net and terminal groups associated with the net; and
group the set of nets into net groups based on the net signatures.

10. The system of claim 9, wherein the instructions when executed cause the processor to provide a graphical user interface (GUI) that specifies the net groups, wherein each net group corresponds to a distinct color.

11. The system of claim 10, wherein the instructions when executed cause the processor to receive a selection of a first net group via the GUI.

12. The system of claim 11, wherein the instructions when executed cause the processor to perform an operation on the first net group.

13. The system of claim 12, wherein the operation is repeater insertion.

14. The system of claim 9, wherein the grouping the route segments comprises identifying route segments that are on a same routing layer and are within a threshold orthogonal distance of each other.

15. The system of claim 9, wherein the grouping the terminals comprises identifying terminals that have a same signal direction and are within a threshold Manhattan distance of each other.

16. The system of claim 9, wherein the determining the net signature comprises combining a sequence of terminal group identifiers and route group identifiers associated with the net.

17. A non-transitory computer-readable medium comprising stored instructions, which when executed by a processor, cause the processor to:
group route segments of a set of nets into route groups;
group terminals of the set of nets into terminal groups;
for each net in the set of nets, determine a net signature for the net based on route groups associated with the net and terminal groups associated with the net;
group the set of nets into net groups based on the net signatures;
assign priorities to the net groups; and
perform repeater insertion on the net groups in accordance with the assigned priorities.

18. The non-transitory computer-readable medium of claim 17, wherein the grouping the route segments comprises identifying route segments that are on a same routing layer and are within a threshold orthogonal distance of each other.

19. The non-transitory computer-readable medium of claim 18, wherein the grouping the terminals comprises identifying terminals that have a same signal direction and are within a threshold Manhattan distance of each other.

20. The non-transitory computer-readable medium of claim 19, wherein the determining the net signature comprises combining a sequence of terminal group identifiers and route group identifiers associated with the net.

* * * * *